(12) United States Patent (10) Patent No.: US 12,504,570 B2
Shiffler (45) Date of Patent: *Dec. 23, 2025

(54) OPTICAL ACCESSORY IDENTIFICATION SYSTEM AND DEVICE

(71) Applicant: Michael the Maven, LLC, Sheridan, WY (US)

(72) Inventor: Michael Shiffler, Sheridan, WY (US)

(73) Assignee: MICHAEL THE MAVEN, LLC, Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/039,106

(22) Filed: Jan. 28, 2025

(65) Prior Publication Data

US 2025/0172730 A1 May 29, 2025

Related U.S. Application Data

(63) Continuation of application No. 18/767,543, filed on Jul. 9, 2024, which is a continuation of application No. 18/084,217, filed on Dec. 19, 2022, now Pat. No. 12,189,156.

(60) Provisional application No. 63/408,263, filed on Sep. 20, 2022.

(51) Int. Cl.
  *G02B 5/28* (2006.01)
  *G03B 17/12* (2021.01)
  *H04N 23/55* (2023.01)

(52) U.S. Cl.
  CPC .............. *G02B 5/286* (2013.01); *G03B 17/12* (2013.01); *H04N 23/55* (2023.01)

(58) Field of Classification Search
  CPC ........ G02B 5/286; H04N 23/55; G03B 11/04; G03B 11/041; G03B 11/043; G03B 11/045; G03B 17/56; G03B 17/563; G09F 3/00
  See application file for complete search history.

(56) References Cited

U.S. PATENT DOCUMENTS

| | | | | |
|---|---|---|---|---|
| 4,982,627 A * | 1/1991 | Johnson | ...................... | G09F 3/00 81/177.1 |
| 5,031,488 A * | 7/1991 | Zumeta | ...................... | G09F 3/00 116/335 |
| 6,393,950 B1 * | 5/2002 | Crosser | ...................... | G09F 3/00 81/177.1 |
| 7,117,765 B1 * | 10/2006 | Wallden | ...................... | G09F 3/00 81/60 |

(Continued)

OTHER PUBLICATIONS

Color coding tools on the cheap the cheap with nail art tape, https://bikeshed.johnhoogstrate.nl/bicycle/workshop/color_coding_tools/, 2017 (Year: 2017).*

(Continued)

*Primary Examiner* — Ephrem Z Mebrahtu
(74) *Attorney, Agent, or Firm* — Travis Banta; Loyal IP Law, PLLC

(57) ABSTRACT

Disclosed herein is an optical accessory identification system and device comprising a plurality of camera filters having a ring. The ring includes an inside rim, an attachment, and an indicator. The inside rim is connected to a top portion of the ring. The attachment is connected to an underside portion of the ring. The one or more indicators are disposed on the ring. The system may include a second optical accessory device with distinct identifiers.

20 Claims, 12 Drawing Sheets

(56) References Cited

U.S. PATENT DOCUMENTS

| | | | |
|---|---|---|---|
| 7,895,724 B1 * | 3/2011 | Dugan | B25B 13/56 29/458 |
| 2014/0140688 A1 | 5/2014 | Xu | |
| 2019/0094661 A1 | 3/2019 | Overall | |
| 2020/0019043 A1 | 1/2020 | Clark | |

OTHER PUBLICATIONS

Michael W. Davidson, Molecular Expressions Optical Microscope Primer Anatomy of the Microscope, 1999, pp. 1-8 [online], [retrieved Sep. 7, 2023], retrieved from the internet <https://micro.magnet.fsu.edu/primer/anatomy/specifications.html> (year: 1999).

Nando Harmsen, We review the Haida NanoPro Magnetic ND Filters, 2021, pp. 1-14 [online], [retrieved Jun. 3, 2023], retrieved from the internet <https://fstoppers.com/review-haida-nanopro-magnetic-nd-filters-570861>. (Year: 2021).

Morgan Nowland, The magnetic lens cap system, 2017, pp. 1-13 [online], [retrieved Jun. 3, 2023], retrieved from the internet <https://www.kickstarter.com/projects/716139566/iris-the-magnetic-lens-cap-system>. (year: 2017).

* cited by examiner

OPTICAL ACCESSORY IDENTIFICATION SYSTEM AND DEVICE

PRIORITY CLAIM

This application is a continuation of and claims priority to and benefit of U.S. patent application Ser. No. 18/767,543 filed on Jul. 9, 2024, which in turn claims priority to U.S. Pat. No. 12,189,156 filed on Dec. 19, 2022 and issued on Jan. 7, 2025, which in turn claims priority to U.S. Provisional Application Ser. No. 63/408,263 filed on Sep. 20, 2022 which is incorporated herein by reference in its entirety, including, but not limited to those portions that specifically appear hereinafter, the incorporation by reference being made with the following exception: In the event that any portion of the above-referenced provisional application is inconsistent with this application, the application supersedes the above referenced provisional application.

TECHNICAL FIELD

The disclosure relates generally to systems and devices related to identifiers installed on optical lens filters.

BACKGROUND

Humankind, throughout the ages, has tried to save a moment in time either to relive that moment or to share that moment with another person. From this desire, re-creation of a moment in time was a new problem to be solved. The first attempts of visual re-creation of events included cave paintings which, likely, acted as a primitive movie with oral story telling. Later in antiquity sculptures and the written word were used to capture and share a re-created moments with others.

Another tool that attempted to capture a moment in time was known as a "camera obscura" which was developed in China around 400 BCE. The camera obscura is essentially a dark room with a small hole where the small hole allows an outside image to be reflected into the dark room. The reflected image could be recorded by tracing or painting the image onto a medium, such as a wall. Some historians argue that the camera obscura is one of the earliest forms of a camera. The camera obscura was so revolutionary in capturing an image, it was even mentioned by Aristotle in the mid-300s BCE. Further development with the camera obscura occurred in the late 1600s when optical glass lenses were invented. Pictures, as objects, arose when it was discovered that silver salts change color when exposed to light.

It was not until the 1800s that the first permanent photograph of a camera image was produced. Afterwards, Daguerreotypes, a type of metallic photograph, were created by Louis Daguerre. While innovative, the images of Daguerreotypes quickly faded, likely due to oxidation of the metals involved in creating the photograph. This fading problem was remedied by the development of a mirror camera which produced a positive image instead of a negative image. In the late 1800s the first instantaneous photos were produced which were essentially an early version of a photograph made popular by Polaroid® cameras a century later.

Development of the camera lens began to expand in complexity and adjustability from the mid-1800s to the 1900s when the telephoto lens was introduced. The next technological advance in cameras came with the production of roll film cameras. These original cameras came with 100 exposures that were required to be sent to New York for development.

In the mid-1800s, the variable focus lens was produced and was designed for portraits, and which allowed for shorter exposure time. Not long after, a wide angled lens was created for panoramic views. Later, lenses with selectable apertures came into use. Cameras became more popular in the 1930s when cameras became more widely available to amateur photographers. Eventually, use and demand drove lenses once made with expensive glass to be made with cheaper plastics.

As camera technology and understanding advanced it became apparent that as a user limits the type or amount of light that passes through the lens, different types of images can be produced. Filtering the light received by a lens can be accomplished by the filter absorption (also known of as attenuation), reflection, polarization, or scatter of the non-transmitted light. The different types of filters may include absorptive, dichromic, monochromatic, infrared, ultraviolet, neutral density, longpass, band-pass, shortpass, polarization, guided mode resonance, metal mesh, arch welding, and wedge filters. Each of these different types of filters may have different optical densities. Optical density is the degree to which the filter restricts light. Since each filter type is created for a specific purpose and may have various optical densities, it can be difficult for users to find a particular filter in a short time frame, such as may be present during a sunrise, a sunset, a passing storm, or a sporting event. Other lens fittings with virtually no optical density, may be placed over a camera lens or a filter for various other reasons, such as scratch resistance, protection, water resistance etc.

Since optical accessories are often stored all together and a specific accessory is needed at a moment's notice a need, exists in the art, for an identifier to identify an optical accessory as quickly as possible. Accordingly, it is the object of this disclosure is to present a system and a device to identify optical accessories using visual and/or tactile indicators for the type of optical accessory desired. The use of visual and/or tactile indicators allows a user to easily select the appropriate lens filter to use at the appropriate moment. This may help a photographer or a scientist to create, view, or produce a desired image.

SUMMARY

Disclosed herein is an optical accessory identification system and device comprising a plurality of camera filters having a ring. The ring includes an inside rim, an attachment, and an indicator. The inside rim is connected to a top portion of the ring. The attachment is connected to an underside portion of the ring. The one or more indicators are disposed on the ring. The system may include a second optical accessory device with distinct identifiers.

Further disclosed herein is a camera filter having a ring, a rim, and a visual indicator which uniquely identifies the type of filter or optical properties provided by the filter visually.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings.

DETAILED DESCRIPTION

Figure 1A:
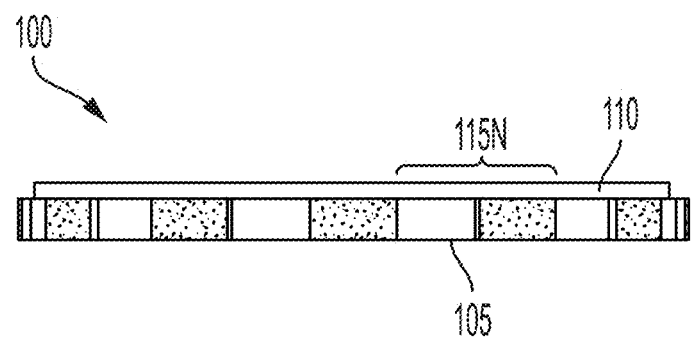
FIGS. 1A-D illustrate a side, perspective, top, and bottom views, respectively, of a lens splash guard of an identifying system and device.
Figure 1B:
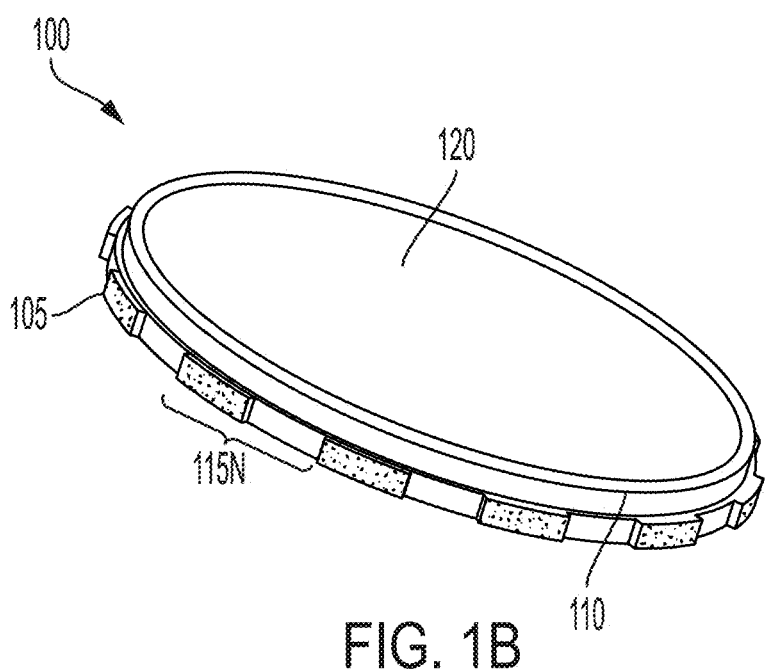

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same or similar reference numbers are used throughout the drawings to refer to the same or similar parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

FIGS. 1A-D illustrate a side, a perspective, a top, and a bottom view of lens splash guard 100 of an identifying system and device. Splash guard 100 may include ring 105 that may encircle the outside of splash guard 100. The ring 105 may also include one or more indicators 115N and inside rim 110. One or more indicators 115N may be found on the outside edge of ring 105 and may extend outwards from the center of splash guard 100.

Further indicators 115N may include a pattern of extended and unextended portions extending from the outside edge of ring 105. One or more of the extended and unextended portions of indicators 115N may include texture. This texture may help a user grip splash guard 100. Also, patterns of textured and non-textured indicators 115N may aid in the identification of the type of optical accessory simply by feel as a tactile indicator. Further, unique pattern of indicators 115N may help the user identify and distinguish, by feel as a tactile indicator, the lens splash guard 100 from other accessories. This unique pattern of indicators 115N implemented together or singly may include one or more of textured and non-textured, extended portions from ring 105, short and long sections, and different shapes for the extended portions positioned around ring 105.

Exemplary splash guard 100 depicted in FIG. 1 includes indicators 115N that include 12 extended portions and 12 non-extended portions (e.g., combined portions make up essentially the circumference of rim 110). Both the 12 extended portion and the non-extended portions depicted are substantially similar in length around the circumference of ring 105. Substantially similar in this circumstance means plus or minus 5%. The 12 extended portions of indicators 115N may be textured while the un-extended portions may not. This number may decrease according to the circumference of the accessory. Otherwise, this number may remain the same and only the length of the sections may decrease. Alternatively, the reverse may be used as well such as having the un-extended portions textured while the extended portions are not. Ring 105 may include a first color such as silver to visually identify splash guard 100. The color coordination system may include a plurality of accessories (e.g., lens cap or camera lens elements, which may attach to a camera lens and includes any type of device intended to alter or facilitate light entering a lens) each with a unique color for visual identification and distinction of an optical property of a particular camera attachment element (e.g., a type of camera filter). An optical property may include optical lens 120 which is intended to have a little interference on the passing of light through optical lens 120 as possible. Other optical properties, discussed herein, may be polarization a 3 stop, 6, stop, and 10 stop filter, or any other light transmission condition, enhancement, or attenuation known in the art of lens filters. Ring 105 may be entirely embodied with a first color or may include dots of a first color or lines of a first color or any indicia using a first color. This may be helpful especially if one or more accessories are stored together, which is often the most convenient way to carry camera accessories.

Figure 1C:
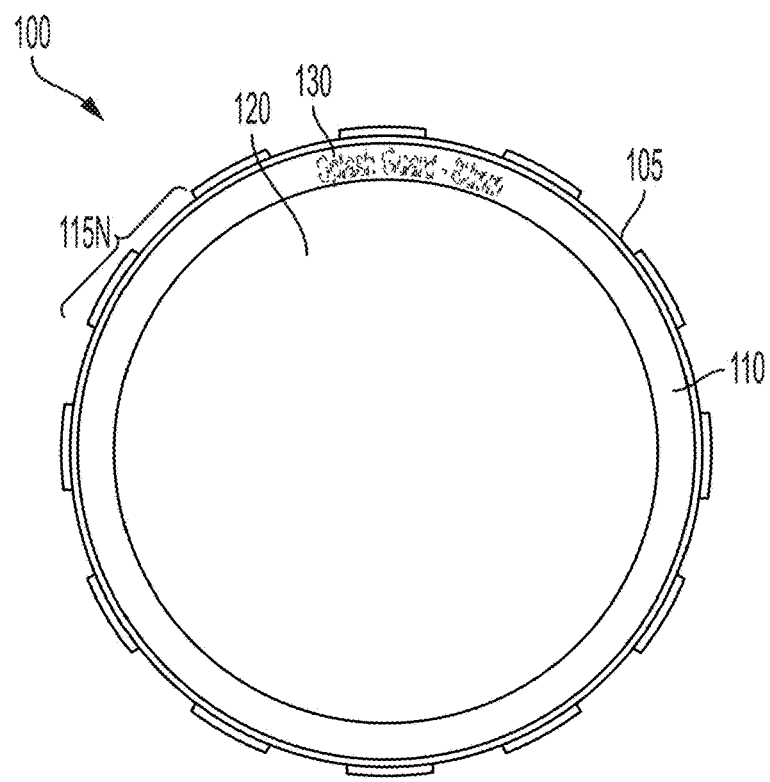

To further aid in the identification of the optical accessory splash guard 100 may include description 130 on the top of inside rim 110 as seen in FIG. 1C. In an alternate embodiment, description 130 may be placed on any portion of splash guard 100. Accordingly, a user may use one or more of indicators 115N, a color of splash guard 100, and description of 130 to identify the needed accessory.

Splash guard 100 may further include optical lens 120 that is positioned within ring 105. Optical lens 120 may be composed of glass or plastics (e.g., polycarbonate, acrylic, PETG, PVC or other materials known to the art). Optical lens 120 may be at least partially transparent to be able to visualize or partially visualize an image through optical lens 120.

Inside rim 110 of splash guard 100 may extend outward from optical lens 120 to ring 105 positioned about an exterior circumference of splash guard 100. Further, a circumference of inside rim 110 may be less than a circumference of ring 105. Alternatively, on the underside of splash guard 100 attachment 125 may be inset within ring 105 such that the outside edge of ring 105 extends downward beyond the bottommost edge of the attachment 125. Since inside rim 110 extends upward and contains a circumference less than that of the outside edge of ring 105, rim 110 from a first accessory may mate with attachment 125 of a second accessory. Thus, attachment 125, of a first accessory, being inset within ring 105 may create a complimentary connection point with rim 110, of a second accessory. These portions of splash guard 100 may allow other similarly shaped accessories to attach to one or more of the top or bottom of the accessory and allows a plurality of accessories to be stacked together, top to bottom or bottom to top.

Figure 1D:
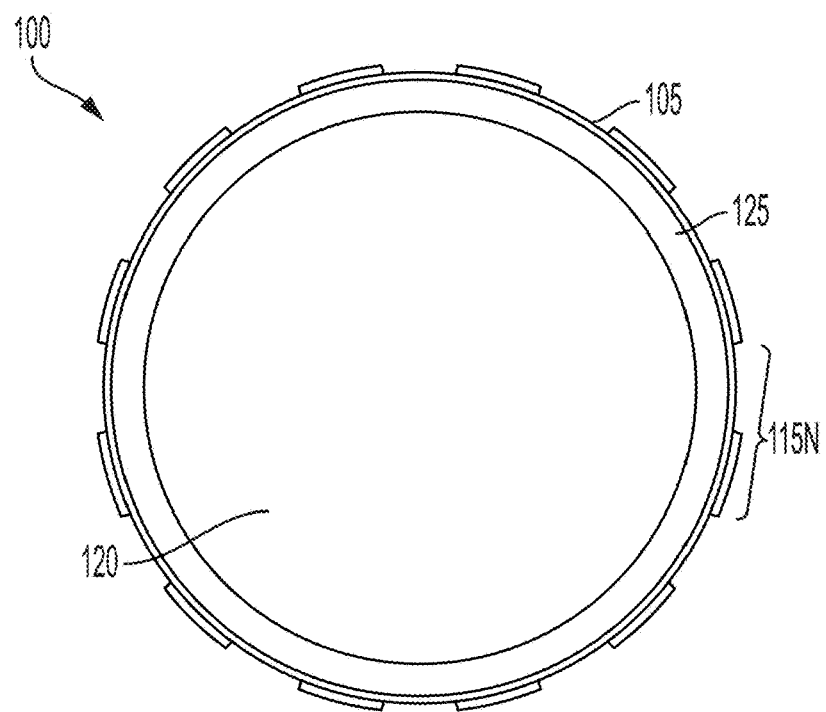

Further, the shape or size may also be complimentary to a camera, scope or other optical instruments known in the art. Ring 105 may include an attachment 125 which is shown in FIG. 1D as a magnet. If each accessory is made of ferromagnetic metals one or more accessories can be combined to produce a specific result or effect. For example, splash guard 100 may include one or more ferromagnetic metals such that splash guard 100 may attach magnetically to a 6 stop ND filter, which, in turn, may attach magnetically to a camera lens, with or without an adapter ring.

Other connectors may include attachments that require a twisting motion such as threads or a combination of threads and a locking mechanism. These also may be combined with multiple other locking mechanisms. As a result, inside rim extension 110 may have one side of a connector while attachment 125 may include the complimentary side of the connector. For example, a camera accessory, may implement an attachment, which includes one or more of a locking mechanism, a magnet, a latch, threads, hook and loop, and a friction attachment the inside rim including one or more connectors while attachment 125 includes the complimentary side of the connector.

FIGS. 2A-D illustrate a side, a perspective, a top, and a bottom view of circular polarizing filter 200 of an identifying system and device. Polarizing filter 200 may include ring 205 that may encircle the outside of polarizing filter 200. The ring 205 may also include one or more indicators 215N and inside rim 210. One or more indicators 215N may be found on the outside edge of ring 205 and may extend outwards from the center of polarizing filter 200.

Further indicators 215N may include a pattern of extended portions extending from the outside edge of ring 205. One or more of the extended and un-extended portions of indicators 215N may include texture. This texture may help a user grip polarizing filter 200. Also, textured and non-textured indicators 215N may aid in the identification of the type of optical accessory simply by feel as a tactile indicator. Further, unique pattern of indicators 215N may help the user identify and distinguish, by feel as a tactile indicator, the lens polarizing filter 200 from other accessories. This unique pattern of indicators 215N implemented together or singly may include one or more of textured and non-textured, extended portions from ring 205, short and long sections, and different shapes for the extended portions positioned around ring 205.

Exemplary polarizing filter 200 depicted in FIG. 2 includes indicators 215N that include 60 extended portions and 60 non-extended portions (e.g., portions that are essentially the circumference of rim 210). Both the 60 extended portion and the non-extended portions depicted are substantially similar in length around the circumference of ring 205. Substantially similar in this circumstance means plus or minus 5%. The 60 extended portions of indicators 215N may be textured while the un-extended portions may not. This number may decrease according to the circumference of the accessory. Otherwise, this number may remain the same and only the length of the sections may decrease. Alternatively, the reverse may be used as well such as having the un-extended portions textured while the extended portions are not. Ring 205 may include a second color such as blue to visually identify polarizing filter 200. Blue may be associated with a clear sky having significant light, which may be instructive to a user to select a polarizing filter for a particular picture. The color coordination system may include a plurality of accessories (e.g., lens cap or camera lens elements, which may attach to a camera lens and includes any type of device intended to alter or facilitate light entering a lens) each with a unique color for visual identification and distinction. Ring 205 may be entirely embodied with a second color or may include dots of a second color or lines of a second color or any indicia using a second color. This may be helpful especially if one or more accessories are stored together, which is often the most convenient way to carry camera accessories.

Figure 2A:
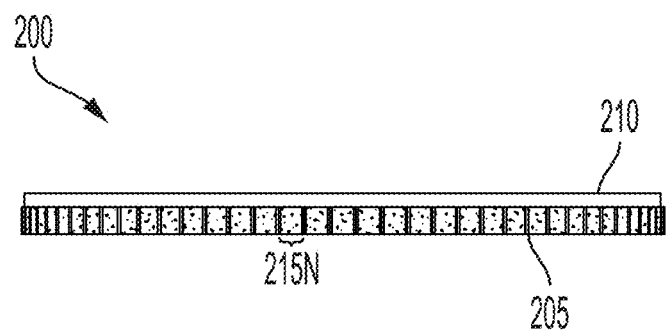
FIGS. 2A-D illustrate side, perspective, top, and bottom views, respectively, of a circular polarizing lens of an identifying system and device.
Figure 2B:
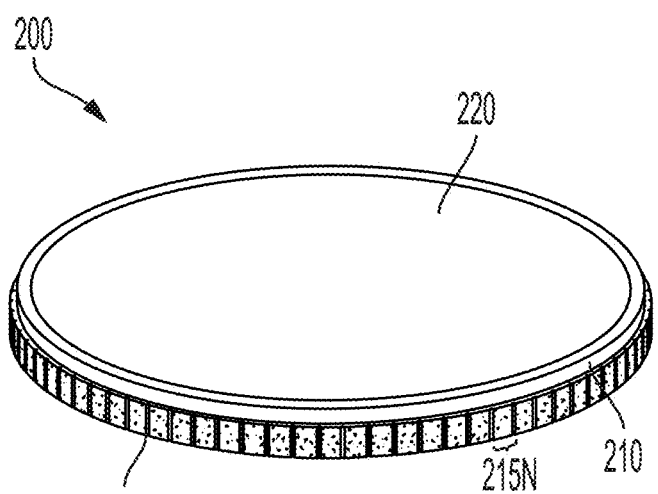
Figure 2C:
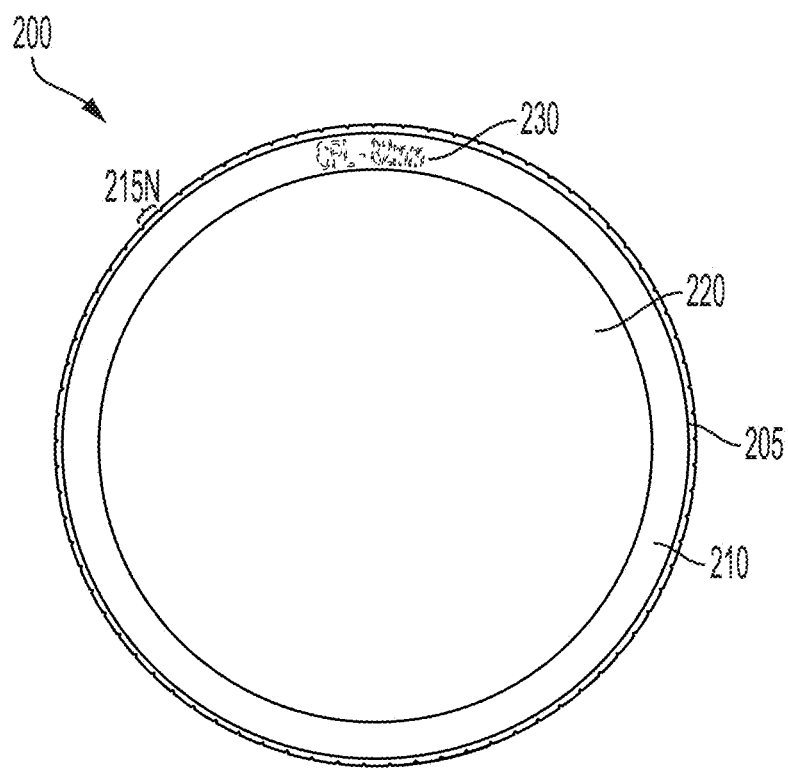

To further aid in the identification of the optical accessory polarizing filter 200 may include description 230 on the top of inside rim 210 as seen in FIG. 2C. In an alternate embodiment, description 230 may be placed on any portion of polarizing filter 200. Accordingly, a user may use one or more of indicators 215N, a color of polarizing filter 200, and description of 230 to identify the needed accessory.

Due to the nature of polarizing filters in general, a rotation of the polarizing filter changes the amount of light let through depending on the angle of incidence of the light and the particular rotation of the polarizing filter. With standard filters, a photographer needs to know how much light attenuation or filtering is occurring, which is also referred to as "stops of light." A polarizing filter, on the other hand, functions to filter light that has been polarized, light which is typically reflected off certain surfaces including water, glass, and other reflective surfaces. A polarizing filter blocks light based on the angle from which that light encounters a polarizing filter. Thus, polarizing filters such as polarizing filter 200 reduce light encountered by the filter while allowing at a desired angle through polarizing filter 200. The reduction in light (e.g. stops of light) by a polarizing filter generally is about 1-1.5 stops of light while he desired angle of light may be adjusted by rotating the polarizing filter 200 by a specific amount. As polarizing filter 200 is rotated, more or less light is allowed through depending on the amount of reflected light encountering polarizing filter 200. In this manner, polarizing filter 200 may remove reflections or control the saturation of color from reflecting certain surfaces can be controlled by a user.

As shown in FIG. 2A-2D each one of indicators 215N are spaced equally apart from each other at a particular distance where each one of indicators 215N has an equal length to allow a user to easily identify an amount of rotation of polarizing filter 200 between shots, for example. Such an implementation has not previously been possible with magnetized polarizing filters but is now possible due to the specific spacing of indicators 215N as having an equal length and an equal distance between each one of indicators 215N, having a consistent depth of grooves between indicators 215N (e.g. a depth of grooves having at least one half of a millimeter (0.5 mm) or deeper, and having a magnetic force weak enough that the magnetic force allows polarizing filter 200 to rotate while also being strong enough to ensure that polarizing filter 200 stays connected to the camera lens via fitting 600 (e.g., between 6 and 9 Newtons of magnetic force), which will be discussed below. It is also noted that when a photographer is using a lens hood, the user may still access indicators 215N to adjust polarizing filter 200 by rotation through a window in the lens hood and without removing the lens hood.

Polarizing filter 200 may further include optical lens 220 that is positioned within ring 205. Optical lens 220 may be composed of glass or plastics (e.g., polycarbonate, acrylic, PETG, PVC or other materials known to the art). Optical lens 220 may be at least partially transparent to be able to visualize or partially visualize an image through optical lens 220.

Inside rim 210 of polarizing filter 200 may extend outward from optical lens 220 to ring 205 positioned about an exterior circumference of polarizing filter 200. Further, a circumference of inside rim 210 may be less than a circumference of ring 205. Alternatively, on the underside of polarizing filter 200 attachment 225 may be inset within ring 205 such that the outside edge of ring 205 extends downward beyond the bottommost edge of the attachment 225. Since inside rim 210 extends upward and contains a circumference less than that of the outside edge of ring 205, rim 210 from a first accessory may mate with attachment 225 of a second accessory. Thus, attachment 225, of a first accessory, being inset within ring 205 may create a complimentary connection point with rim 210, of a second accessory. These portions of polarizing filter 200 may allow other similarly shaped accessories to attach to one or more of the top or bottom of the accessory and allows a plurality of accessories to be stacked together, top to bottom or bottom to top.

Figure 2D:
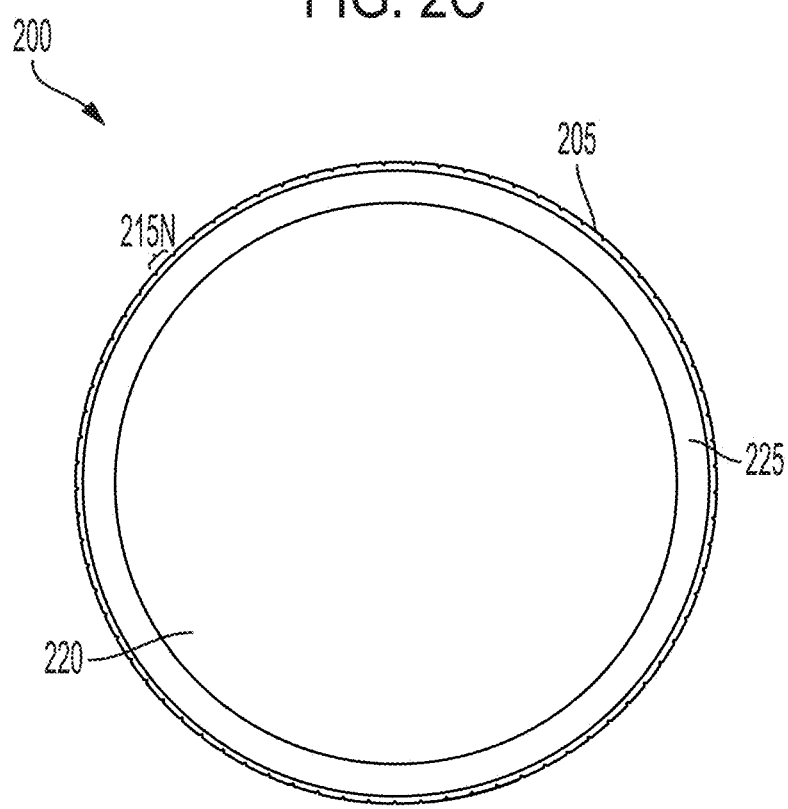

Further, the shape or size may also be complimentary to a camera, scope or other optical instruments known in the art. Ring 205 may include an attachment 225 which is shown in FIG. 2D as a magnet. If each accessory is made of ferromagnetic metals one or more accessories can be combined to produce a specific result or effect. For example, splash guard 100 may include one or more ferromagnetic metals such that splash guard 100 may attach magnetically to polarizing filter 200, which, in turn, may attach magnetically to a camera lens, with or without an adapter ring.

Other connectors may include attachments that require a twisting motion such as threads or a combination of threads and a locking mechanism. These also may be combined with multiple other locking mechanisms. As a result, inside rim extension 210 may have one side of a connector while attachment 225 may include the complimentary side of the connector. For example, a camera accessory, may implement an attachment, which includes one or more of a locking mechanism, a magnet, a latch, threads, hook and loop, and a friction attachment the inside rim including one or more connectors while attachment 225 includes the complimentary side of the connector.

FIGS. 3A-D illustrate a side, a perspective, a top, and a bottom view of 3 stop ND filter 300 of an identifying system and device. 3 stop ND filter 300 may include ring 305 that may encircle the outside of 3 stop ND filter 300. The ring 305 may also include one or more indicators 315N and inside rim 310. One or more indicators 315N may be found on the outside edge of ring 305 and may extend outwards from the center of 3 stop ND filter 300.

Further indicators 315N may include a pattern of extended portions extending from the outside edge of ring 305. One or more of the extended and un-extended portions of indicators 315N may include texture. This texture may help a user grip 3 stop ND filter 300. Also, textured and non-textured indicators 315N may aid in the identification of the type of optical accessory simply by feel as a tactile indicator. Further, unique pattern of indicators 315N may help the user identify and distinguish, by feel as a tactile indicator, the lens 3 stop ND filter 300 from other accessories. This unique pattern of indicators 315N implemented together or singly may include one or more of textured and non-textured, extended portions from ring 305, short and long sections, and different shapes for the extended portions positioned around ring 305.

Exemplary 3 stop ND filter 300 depicted in FIGS. 3A-3D includes indicators 315N that include 27 extended portions and 27 non-extended portions (e.g., portions that are essentially the circumference of rim 310). There may be two sizes of the extended portions: short and long (short and long lengths are considered along the length of the circumference and relative to each other). There may be 18 short and 9 long extended portions. The short portions may be grouped in twos followed by one long portion each separated by a non-extended portion. In this manner the non-extended portions may be grouped together in threes such that there may be 9 groups of 3 of the non-extended portions. Non-extended portions may be shorter than both the short and the long extended portions. The 27 extended portions of indicators 315N are textured while the 27 un-extended portions are not. This number may decrease according to the circumference of the accessory. Otherwise, this number may remain the same and only the length of the sections may decrease. Alternatively, the reverse may be used as well such as having the un-extended portions textured while the extended portions are not. Ring 305 may include a third color such as red to visually identify 3 stop ND filter 300. The color coordination system may include a plurality of accessories (e.g., lens cap or camera lens elements, which may attach to a camera lens and includes any type of device intended to alter or facilitate light entering a lens) each with a unique color for visual identification and distinction. Ring 305 may be entirely embodied with a third color or may include dots of a third color or lines of a third color or any indicia using a third color. This may be helpful especially if one or more accessories are stored together, which is often the most convenient way to carry camera accessories.

Figure 3A:
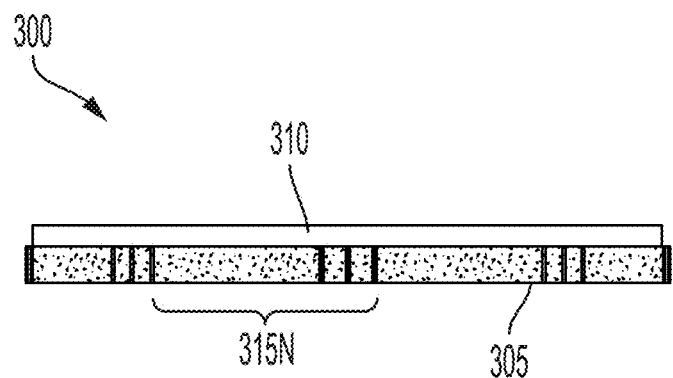
FIGS. 3A-D illustrate side, perspective, top, and bottom views, respectively, of a 3 stop ND (neutral density) filter of an identifying system and device.
Figure 3B:
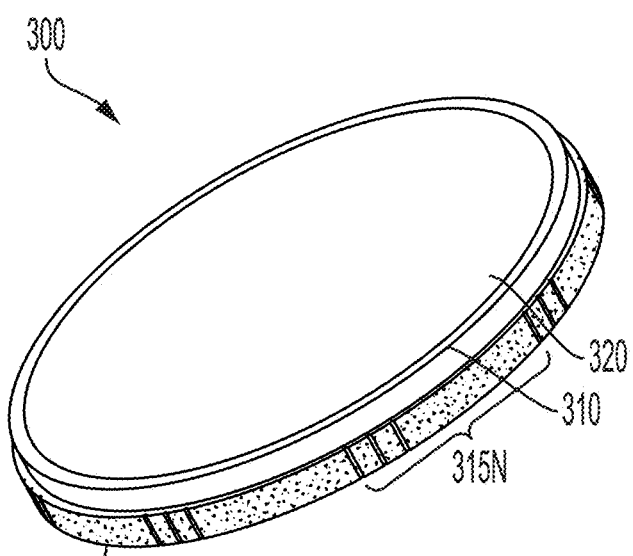
Figure 3C:
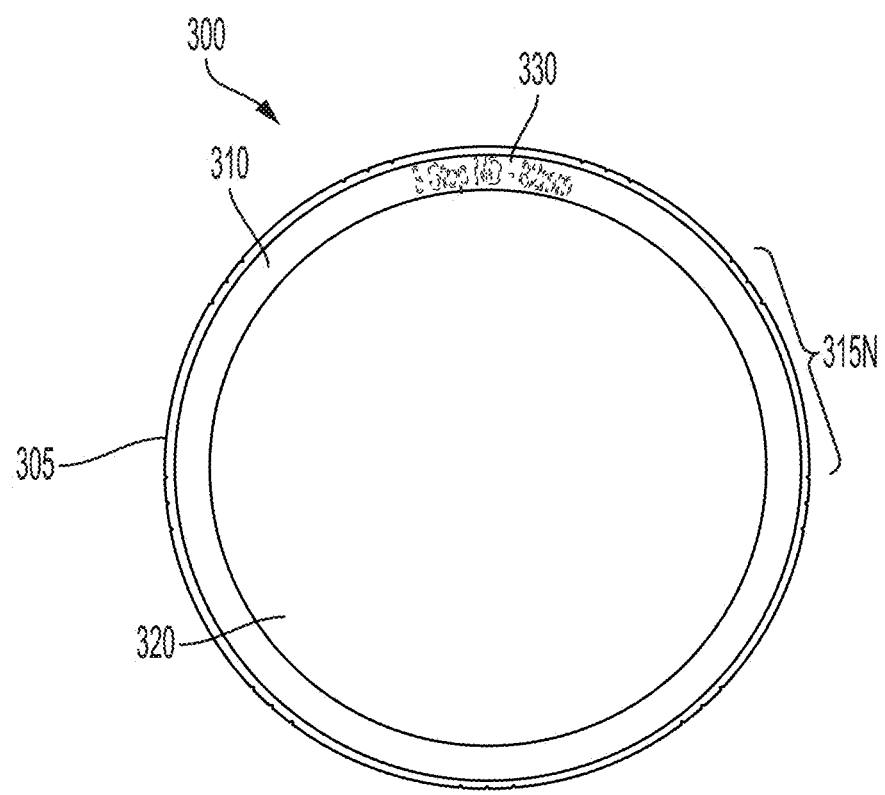

To further aid in the identification of the optical accessory 3 stop ND filter 300 may include description 330 on the top of inside rim 310 as seen in FIG. 3C. In an alternate embodiment, description 330 may be placed on any portion of 3 stop ND filter. Accordingly, a user may use one or more of indicators 315N, a color of 3 stop ND filter, and description of 330 to identify the needed accessory.

3 stop ND filter 300 may further include optical lens 320 that is positioned within ring 305. Optical lens 320 may be composed of glass or plastics (e.g., polycarbonate, acrylic, PETG, PVC or other materials known to the art). Optical lens 320 may be at least partially transparent to be able to visualize or partially visualize an image through optical lens 320.

Inside rim 310 of 3 stop ND filter 300 may extend outward from optical lens 320 to ring 305 positioned about an exterior circumference of 3 stop ND filter 300. Further, a circumference of inside rim 310 may be less than a circumference of ring 305. Alternatively, on the underside of 3 stop ND filter 300 attachment 325 may be inset within ring 305 such that the outside edge of ring 305 extends downward beyond the bottommost edge of the attachment 325. Since inside rim 310 extends upward and contains a circumference less than that of the outside edge of ring 305, rim 310 from a first accessory may mate with attachment 325 of a second accessory. Thus, attachment 325, of a first accessory, being inset within ring 305 may create a complimentary connection point with rim 310, of a second accessory. These portions of 3 stop ND filter 300 may allow other similarly shaped accessories to attach to one or more of the top or bottom of the accessory and allows a plurality of accessories to be stacked together, top to bottom or bottom to top.

Figure 3D:
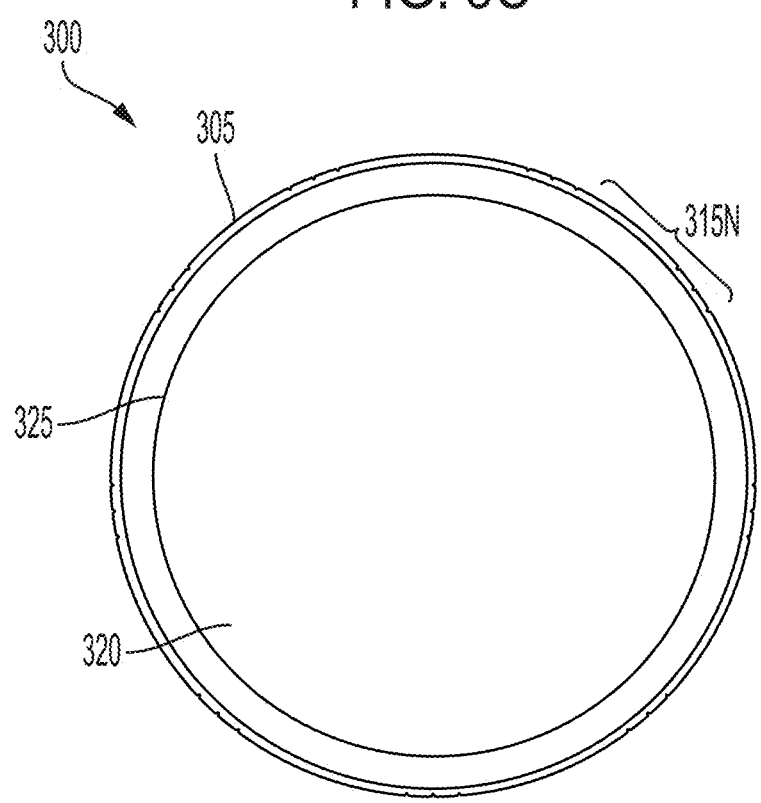

Further, the shape or size may also be complimentary to a camera, scope or other optical instruments known in the art. Ring 305 may include an attachment 325 which is shown in FIG. 3D as a magnet. If each accessory is made of ferromagnetic metals one or more accessories can be combined to produce a specific result or effect. For example, 3 stop ND filter 300 may include one or more ferromagnetic metals such that splash guard 100 may attach magnetically to 3 stop ND filter 300, which, in turn, 3 stop ND filter 300 or splash guard 100 may attach magnetically to a camera lens, with or without an adapter ring.

Other connectors may include attachments that require a twisting motion such as threads or a combination of threads and a locking mechanism. These also may be combined with multiple other locking mechanisms. As a result, inside rim extension 310 may have one side of a connector while attachment 325 may include the complimentary side of the connector. For example, a camera accessory, may implement an attachment, which includes one or more of a locking mechanism, a magnet, a latch, threads, hook and loop, and a friction attachment the inside rim including one or more connectors while attachment 325 includes the complimentary side of the connector.

FIGS. 4A-D illustrate a side, a perspective, a top, and a bottom view of 6 stop ND filter 400 of an identifying system and device. 6 stop ND filter 400 may include ring 405 that may encircle the outside of 6 stop ND filter 400. The ring 405 may also include one or more indicators 415N and inside rim 410. One or more indicators 415N may be found on the outside edge of ring 405 and may extend outwards from the center of 6 stop ND filter 400.

Further indicators 415N may include a pattern of extended portions extending from the outside edge of ring 405. One or more of the extended and un-extended portions of indicators 415N may include texture. This texture may help a user grip 6 stop ND filter. Also, textured and non-textured indicators 415N may aid in the identification of the type of optical accessory simply by feel as a tactile indicator. Further, unique pattern of indicators 415N may help the user identify and distinguish, by feel as a tactile indicator, the lens 6 stop ND filter from other accessories. This unique pattern of indicators 415N implemented together or singly may include one or more of textured and non-textured, extended portions from ring 405, short and long sections, and different shapes for the extended portions positioned around ring 405.

Exemplary 6 stop ND filter 400 depicted in FIG. 4A-4D includes indicators 415N that include 30 extended portions and 30 non-extended portions (e.g., portions that are essentially the circumference of rim 410). There may be two sizes of the extended portions: short and long (short and long lengths are considered along the length of the circumference and relative to each other). There may be 25 short and 5 long extended portions. The short portions may be grouped in fives followed by one long portion each separated by a non-extended portion. In this manner the non-extended portions may be grouped together in sixes such that there may be 5 groups of 6 of the non-extended portions. Non-extended portions may be shorter than both the short and the long extended portions. The 30 extended portions of indicators 415N are textured while the 30 un-extended portions are not. This number may decrease according to the circumference of the accessory. Otherwise, this number may remain the same and only the length of the sections may decrease. Alternatively, the reverse may be used as well such as having the un-extended portions textured while the extended portions are not. Ring 405 may include a fourth color such as red to visually identify 6 stop ND filter 400. The color red may be used for 6 stop ND filter 400 to represent the red sky that can be seen at dawn or dusk which are mid-light conditions during which 6 stop ND filter 400 is used, which is instructive to the use of which filter to select for a particular picture. The color coordination system may include a plurality of accessories (e.g., lens cap or camera lens elements, which may attach to a camera lens and includes any type of device intended to alter or facilitate light entering a lens) each with a unique color for visual identification and distinction. Ring 405 may be entirely embodied with a fourth color or may include dots of a fourth color or lines of a fourth color or any indicia using a fourth color. A 6 stop ND filter 400 may be purple, which is associated with a purple sky at dusk or dawn which may be instructive to a user for which filter to select for a particular photography condition. This may be helpful especially if one or more accessories are stored together, which is often the most convenient way to carry camera accessories.

Figure 4A:
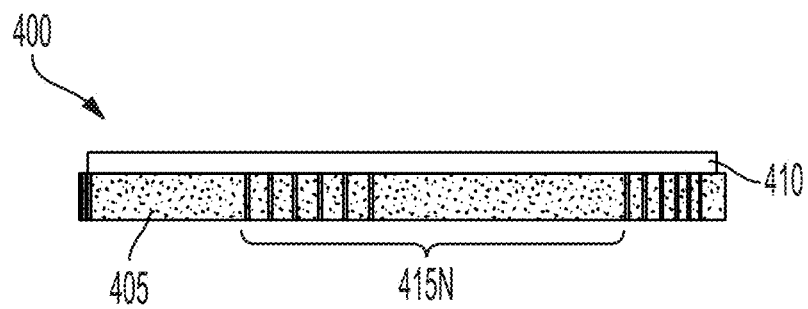
FIGS. 4A-D illustrate side, perspective, top, and bottom views, respectively, of a 6 stop ND (neutral density) filter of an identifying system and device.
Figure 4B:
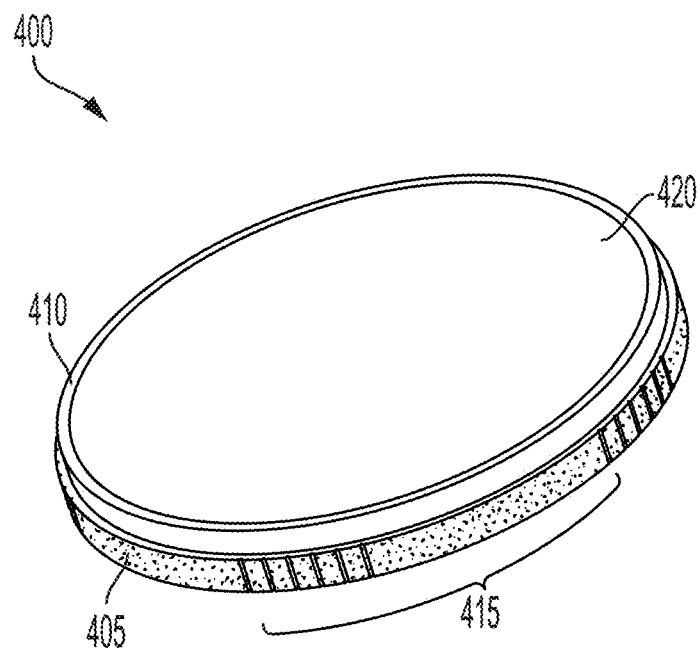
Figure 4C:
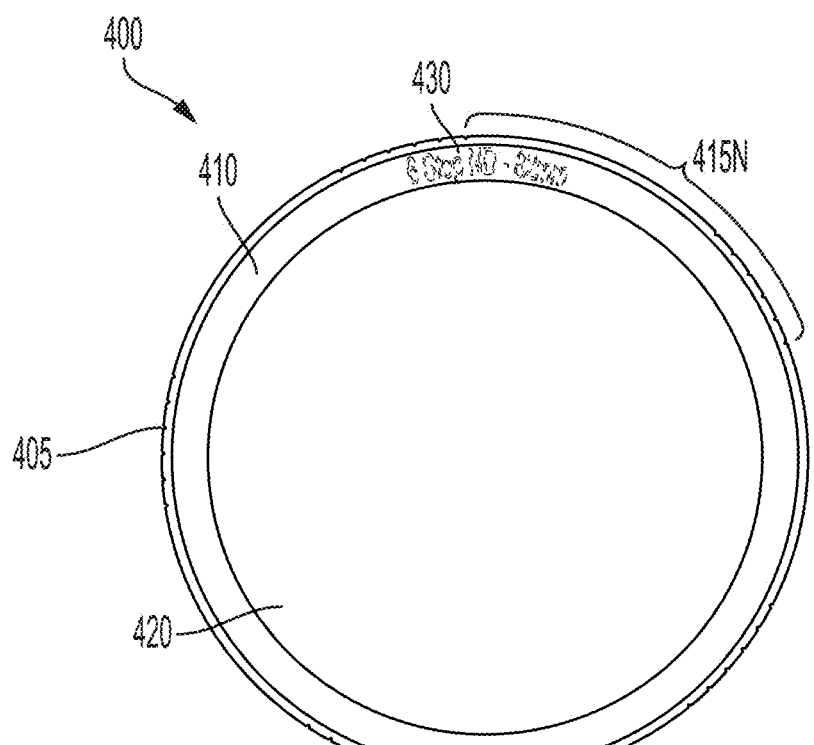

To further aid in the identification of the optical accessory 6 stop ND filter 400 may include description 430 on the top of inside rim 410 as seen in FIG. 4C. In an alternate embodiment, description 430 may be placed on any portion of 6 stop ND filter 400. Accordingly, a user may use one or more of indicators 415N, a color of 6 stop ND filter 400, and description of 430 to identify the needed accessory.

6 stop ND filter 400 may further include optical lens 420 that is positioned within ring 405. Optical lens 420 may be composed of glass or plastics (e.g., polycarbonate, acrylic, PETG, PVC or other materials known to the art). Optical lens 420 may be at least partially transparent to be able to visualize or partially visualize an image through optical lens 420.

Inside rim 410 of 6 stop ND filter 400 may extend outward from optical lens 420 to ring 405 positioned about an exterior circumference of 6 stop ND filter 400. Further, a circumference of inside rim 410 may be less than a circumference of ring 405. Alternatively, on the underside of 6 stop ND filter 400 attachment 425 may be inset within ring 405 such that the outside edge of ring 405 extends downward beyond the bottommost edge of the attachment 425. Since inside rim 410 extends upward and contains a circumference less than that of the outside edge of ring 405, rim 410 from a first accessory may mate with attachment 425 of a second accessory. Thus, attachment 425, of a first accessory, being inset within ring 405 may create a complimentary connection point with rim 410, of a second accessory. These portions of 6 stop ND filter 400 may allow other similarly shaped accessories to attach to one or more of the top or bottom of the accessory and allows a plurality of accessories to be stacked together, top to bottom or bottom to top.

Figure 4D:
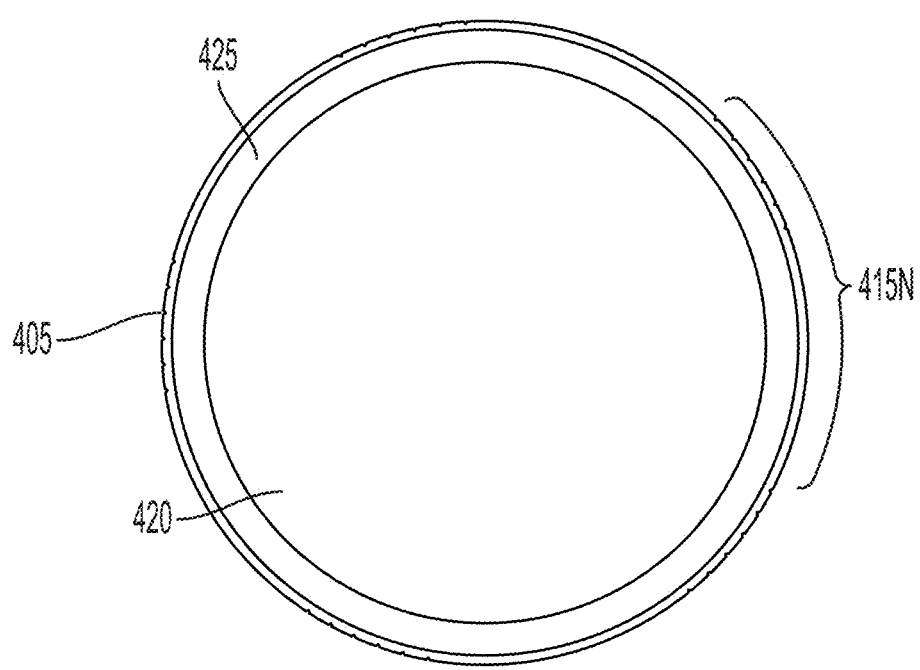

Further, the shape or size may also be complimentary to a camera, scope or other optical instruments known in the art. Ring 405 may include an attachment 425 which is shown in FIG. 4D as a magnet. If each accessory is made of ferromagnetic metal one or more accessories can be combined to produce a specific result or effect. For example, 6 stop ND filter 400 may include one or more ferromagnetic metals such that splash guard 100 may attach magnetically to 6 stop ND filter 400, which, in turn, may attach magnetically to a camera lens, with or without an adapter ring.

Other connectors may include attachments that require a twisting motion such as threads or a combination of threads and a locking mechanism. These also may be combined with multiple other locking mechanisms. As a result, inside rim extension 410 may have one side of a connector while attachment 425 may include the complimentary side of the connector. For example, a camera accessory, may implement an attachment, which includes one or more of a locking mechanism, a magnet, a latch, threads, hook and loop, and a friction attachment the inside rim including one or more connectors while attachment 425 includes the complimentary side of the connector.

FIGS. 5A-D illustrate a side, a perspective, a top, and a bottom view of 10 stop ND filter 500 of an identifying system and device. 10 stop ND filter 500 may include ring 505 that may encircle the outside of 10 stop ND filter 500. The ring 505 may also include one or more indicators 515N and inside rim 510. One or more indicators 515N may be found on the outside edge of ring 505 and may extend outwards from the center of 10 stop ND filter 500.

Further indicators 515N may include a pattern of extended portions extending from the outside edge of ring 505. One or more of the extended and un-extended portions of indicators 515N may include texture. This texture may help a user grip 10 stop ND filter 500. Also, textured and non-textured indicators 515N may aid in the identification of the type of optical accessory simply by feel as a tactile indicator. Further, unique pattern of indicators 515N may help the user identify and distinguish, by feel as a tactile indicator, the lens 10 stop ND filter 500 from other accessories. This unique pattern of indicators 515N implemented together or singly may include one or more of textured and non-textured, extended portions from ring 505, short and long sections, and different shapes for the extended portions positioned around ring 505.

Exemplary 10 stop ND filter 500 depicted in FIG. 5A-5D includes indicators 515N that include 40 extended portions and 40 non-extended portions (e.g., portions that are essentially the circumference of rim 510). There may be two sizes of the extended portions: short and long (short and long lengths are considered along the length of the circumference and relative to each other). There may be 36 short and 4 long extended portions. The short portions may be grouped in nines followed by one long portion each separated by a non-extended portion. In this manner the non-extended portions may be grouped together in tens such that there may be 5 groups of 10 of the non-extended portions. Non-extended portions may be shorter than both the short and the long extended portions. The 40 extended portions of indicators 515N are textured while the 40 un-extended portions are not. This number may decrease according to the circumference of the accessory. Otherwise, this number may remain the same and only the length of the sections may decrease. Alternatively, the reverse may be used as well such as having the un-extended portions textured while the extended portions are not. Ring 505 may include a fifth color such as orange to visually identify 10 stop ND filter 500. The color orange may be used for 10 stop ND filter 500 to represent the sun and 10 stop ND filters 500 are often used for long daylight exposures and thus be instructive to a user for which filter to select in a particular photography condition. The color coordination system may include a plurality of accessories (e.g., lens cap or camera lens elements, which may attach to a camera lens and includes any type of device intended to alter or facilitate light entering a lens) each with a unique color for visual identification and distinction. Ring 505 may be entirely embodied with a fifth color or may include dots of a fifth color or lines of a fifth color or any indicia using a fifth color. This may be helpful especially if one or more accessories are stored together, which is often the most convenient way to carry camera accessories.

Figure 5A:
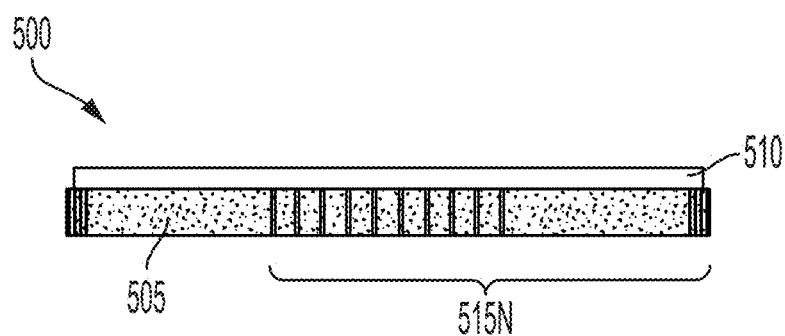
FIGS. 5A-D illustrate side, perspective, top, and bottom views, respectively, of a 10 stop ND (neutral density) filter of an identifying system and device.
Figure 5B:
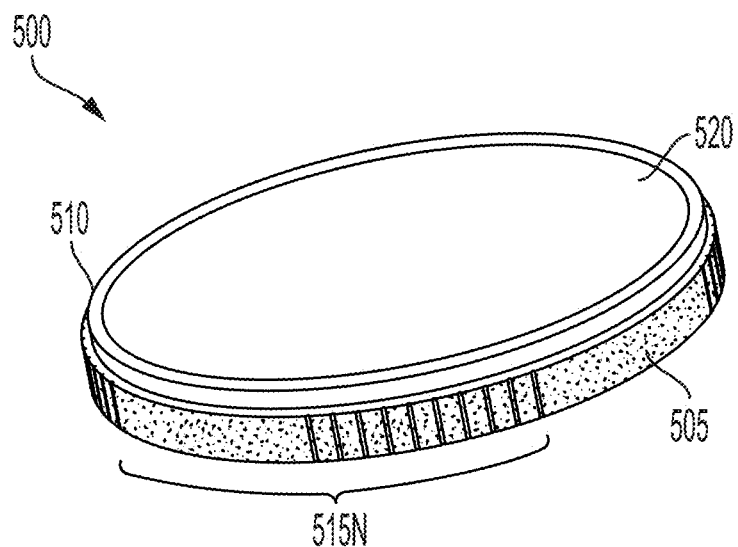
Figure 5C:
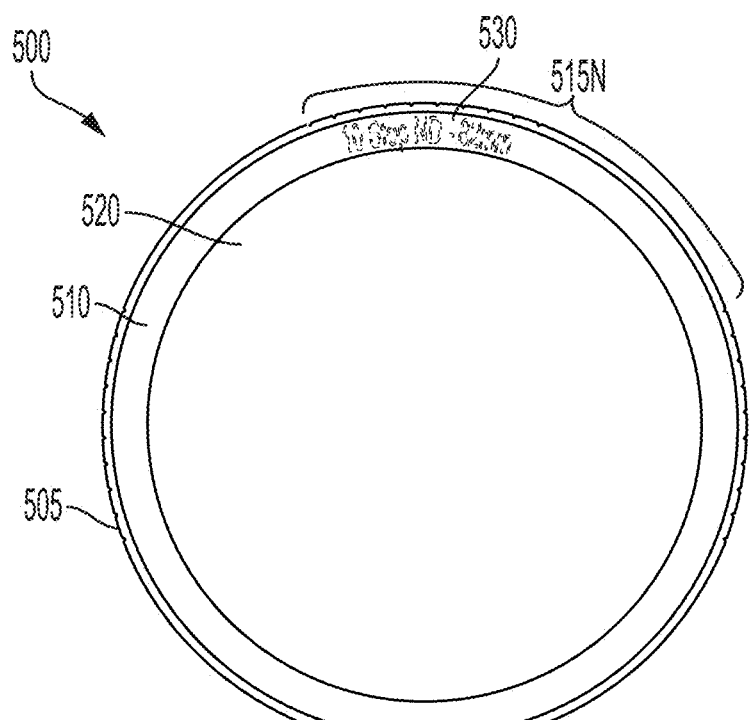

To further aid in the identification of the optical accessory 10 stop ND filter may include description 530 on the top of inside rim 510 as seen in FIG. 5C. In an alternate embodiment, description 530 may be placed on any portion of 10 stop ND filter. Accordingly, a user may use one or more of indicators 515N, a color of 10 stop ND filter, and description of 530 to identify the needed accessory.

10 stop ND filter 500 may further include optical lens 520 that is positioned within ring 505. Optical lens 520 may be composed of glass or plastics (e.g., polycarbonate, acrylic, PETG, PVC or other materials known to the art). Optical lens 520 may be at least partially transparent to be able to visualize or partially visualize an image through optical lens 520.

Inside rim 510 of 10 stop ND filter 500 may extend outward from optical lens 520 to ring 505 positioned about an exterior circumference of 10 stop ND filter 500. Further, a circumference of inside rim 510 may be less than a circumference of ring 505. Alternatively, on the underside of 10 stop ND filter 500 attachment 525 may be inset within ring 505 such that the outside edge of ring 505 extends downward beyond the bottommost edge of the attachment 525. Since inside rim 510 extends upward and contains a circumference less than that of the outside edge of ring 505, rim 510 from a first accessory may mate with attachment 525 of a second accessory. Thus, attachment 525, of a first accessory, being inset within ring 505 may create a complimentary connection point with rim 510, of a second accessory. These portions of 10 stop ND filter 500 may allow other similarly shaped accessories to attach to one or more of the top or bottom of the accessory and allows a plurality of accessories to be stacked together, top to bottom or bottom to top.

Figure 5D:
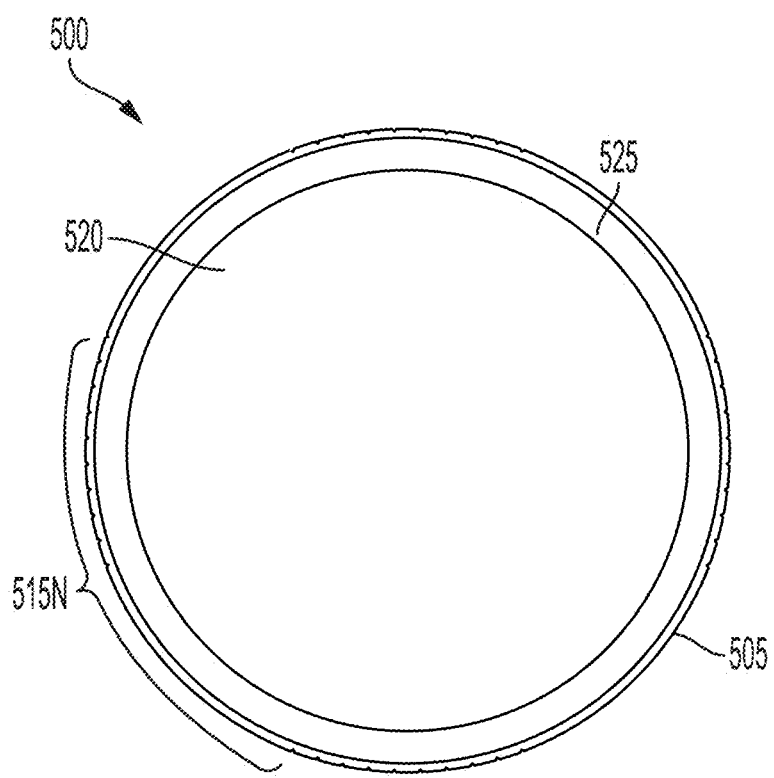

Further, the shape or size may also be complimentary to a camera, scope or other optical instruments known in the art. Ring 505 may include an attachment 525 which is shown in FIG. 5D as a magnet. If each accessory is made of ferromagnetic metal one or more accessories can be combined to produce a specific result or effect. For example, 10 stop ND filter 500 may include one or more ferromagnetic metals such that splash guard 100 may attach magnetically to 10 stop ND filter 500, which, in turn, may attach magnetically to a camera lens, with or without an adapter ring.

Other connectors may include attachments that require a twisting motion such as threads or a combination of threads and a locking mechanism. These also may be combined with multiple other locking mechanisms. As a result, inside rim extension 510 may have one side of a connector while attachment 525 may include the complimentary side of the connector. For example, a camera accessory, may implement an attachment, which includes one or more of a locking mechanism, a magnet, a latch, threads, hook and loop, and a friction attachment the inside rim including one or more connectors while attachment 525 includes the complimentary side of the connector.

FIGS. 6A-D illustrate a side, a perspective, a top, and a bottom view of ring fitting 600 of an identifying system and device. Fitting 600 may include threads which attach to a camera lens and provide a base for attaching any of the other camera lens attachment elements disclosed herein using any attachments disclosed herein. Fitting 600 may include ring 605 that may encircle the outside of fitting 600. The ring 605 may also include one or more indicators 615N and inside rim 610. One or more indicators 615N may be found on the outside edge of ring 605 and may extend outwards from the center fitting 600.

Further indicators 615N may include a pattern of extended portion and un-extended portions from the outside edge of ring 605. One or more of the extended and un-extended portions of indicators 615N may include texture. This texture may help a user grip fitting 600. Also, textured 615N may aid in the identification of the type of optical accessory in hand. Further, unique pattern of indicators 615N may help the user identify the fitting 600 from other accessories. This unique pattern of indicators 615N may include one or more different shapes positioned around ring 605.

Exemplary fitting 600 depicted in FIG. 6 includes indicator 615N that includes a continuous textured non extended portion of indicator 615N. Alternatively, the reverse may be used as well such as having the un-extended portions non-textured. Ring 605 may include a color such as dark gray to further identify what accessory it is. Gray may represent that of a tool of which fitting 600 is used to connect to a camera and/or another optical device or accessory. The color coordination system may include a plurality of accessories each with a unique color. This may be helpful especially if one or more accessories are stored in the same compartment which is often the most convenient way to carry accessories.

Figure 6A:
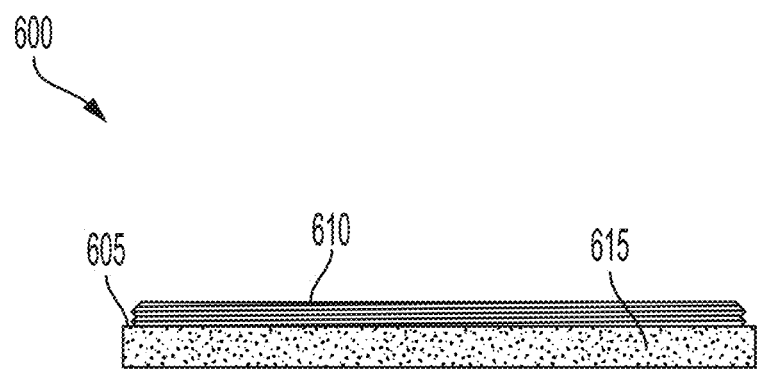
FIGS. 6A-D illustrate side, perspective, top, and bottom views, respectively, of a ring fitting of an identifying system and device.
Figure 6B:
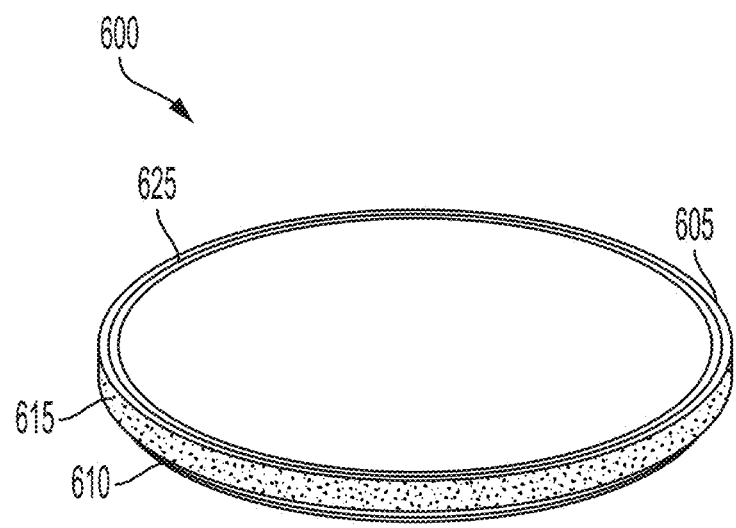
Figure 6C:
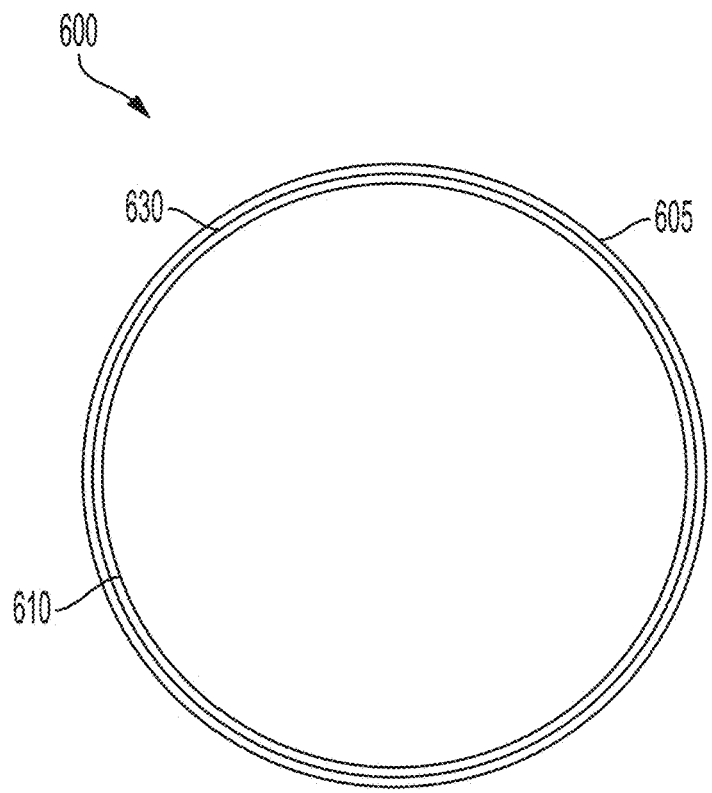
Figure 6D:
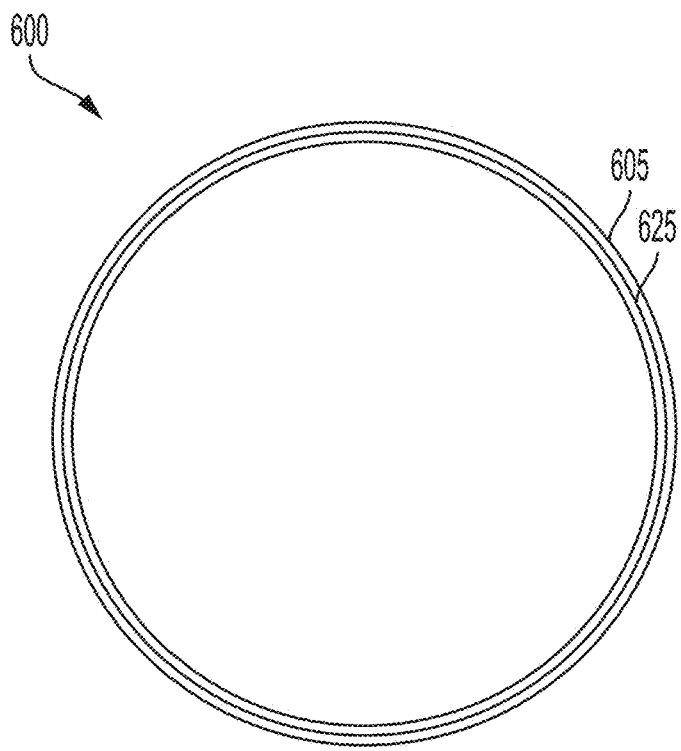

To further aid in the identification of the optical accessory fitting 600 may include description 630 on the top of inside rim 610 as seen in FIG. 6C. In an alternate embodiment, description 630 may be place on any portion of fitting 600. Accordingly, a user may use one or more of indicators 615N, color of fitting 600, and description of 630 to identify the needed accessory.

Inside rim 610 fitting 600 may extend upward from ring 605 and may be threaded along the outside and/or inside edges. Further the circumference of inside rim 610 may be less than the circumference of the outside edge of ring 605. Alternatively, on the underside fitting 600 attachment 625 may be inset within ring 605 such that the outside edge of ring 605 extends downward beyond the bottommost edge of the attachment 625. Since inside rim 610 extends upward and attachment 625 is inset within ring 605 this may create a complimentary connection point. This shape may allow other similarly shaped accessories to attach to one or more of the top or bottom of the accessory.

Further, the shape or size may also be complimentary to a camera, scope or other optical instruments known in the art. Ring 605 may include an attachment 625 here is depicted as a magnet. If each accessory is made of ferromagnetic metal one or more accessories can be combined to produce a different result. For example, fitting 600 may include one or more ferromagnetic metals such that fitting 600 attaches magnetically to splash guard 100. Connecting to one or more accessory may be for storage or for use.

Other connectors may include attachments that require a twisting motion such as threads or a combination of threads and a locking mechanism. These also may be combined with multiple other locking mechanisms. As a result, inside rim extension 610 may have one side of a connector while attachment 625 may include the complimentary side of the connector. For example, a camera accessory, as an attaching mechanism, may include one or more of a locking mechanism, a magnet, a latch, threads, hook and loop, and a friction attachment the inside rim including one or more connectors while attachment 625 includes the complimentary side of the connector.

As discussed herein, a plurality of colors is associated with a particular camera lens attachment element (conventionally referred to as a "camera filter", a "lens filter", or a "filter"). These colors are described as a first color, a second color, a third color, a fourth color, a fifth color, and a sixth color for the particular camera lens attachment elements disclosed herein. However, more broadly, each particular camera lens attachment element may be associated with a particular base color such that each base color is a distinctive color (e.g. a primary color, a secondary color (a combination of two primary colors, a metallic color (gold, silver, copper, brass etc.), or black) and not a shade or gradient of another color. For example, silver, blue, red, purple, gold, and gray are distinctive colors for the purpose of this disclosure that are not a shade or gradient of another one of the colors used on a particular camera lens attachment element where shades or gradients of these colors would be, for example, light red, or dark purple, or baby blue, dark grey, or similar. It is also noted that while the shades of the particular base colors may be different shades of a single color, other filters within a set or camera filter system will use their own distinctive base colors that are not shades or gradients of a distinctive base color of another filter within the set or system (e.g., if a polarizing filter is light blue, the 3 stop ND filter in the set or system may be a color that is not any shade or gradient of blue). It may be possible that other elements, such as adapter elements may be implemented as being green with their own unique visual and/or tactile identifiers as an indicator of speed in connecting different systemic elements, instructing the user as to the purpose of that particular element. Similarly, yellow could be indicative of removing yellow haze from long night time exposure and indicate which filter to select to a user. A cream or off white filter may be indicative of a filter that turns light into a soft glow if that type of filter is desired for a particular picture taking condition and instructive to the user. Any association of any primary, secondary color, white, black, or metallic color, may be considered distinctive for the purposes of this disclosure and may be associated with a particular camera lens attachment element. Other elements in a set of filters, such as a variable ND filter may be assigned another base color different from others in the set of filters.

It is also noted that combinations of colors for other camera lens attachment elements are possible. For example, a camera filter with a 3 stop ND circular polarizing filter may be implemented with a first color and a second color on the camera filter. Using the examples herein, a 3 stop ND filter with a circular polarizing ability may be implemented as being red and blue as a visual indicator of the function of the filter. Thus, while a single color may be used to visually indicate the function of the filter, two or more colors may also be used to visually indicate the function of the filter, if the filter performs two or more different functions (e.g., a 3 stop ND filter with polarizing properties may include a visual indicator with both blue and red, for example. Other combinations using the visual indicators for combination of functions is possible).

Finally, as disclosed herein, each one of splash guard 100, polarizing filter 200, 3 stop ND filter 300, 6 stop ND filter 400, 10 stop ND filter 500 or fitting 600 may include tactile elements which may be implemented as disclosed herein or may be implemented as notches or any other tactile element detectable by a human hand. These specific tactile elements disclosed herein may be altered or changed for any reason so long as each individual camera lens attachment element includes a tactile identifier unique to that particular type of camera lens attachment element. For example, the tactile identifier for a polarizing filter 200 is unique to polarizing filter 200 and is different from any other tactile identifier for any other camera lens attachment element.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A camera filter system, comprising,
a plurality of camera filters, each camera filter including:
a ring;
a rim; and
an optical lens;
wherein each optical lens in the plurality of camera filters provides a different optical property for the transmission of light through the optical lens, the different optical properties for each one of the plurality of camera filters applying a unique alteration to light entering the optical lens among the plurality of camera filters; and
wherein each individual one of the camera filters in the plurality of camera filters includes a visual indicator that includes a plurality of distinctive base colors, where each one of the plurality of distinctive base colors is uniquely associated with each optical property of each individual optical lens in the plurality of camera filters and that identifies the different optical properties of each optical lens in the plurality of camera filters.

2. The camera filter system of claim 1, wherein a first distinctive base color is applied as a visual indicator on a polarizer camera filter.

3. The camera filter of claim 2, wherein a second distinctive base color is applied as a visual indicator on a brightness camera filter.

4. The camera filter system of claim 3, wherein a camera filter having both a polarizing optical property and a brightness filtering optical property includes visual indicators for both the first distinctive base color and the second distinctive base color.

5. The camera filter system of claim 1, wherein the distinctive base color associated with each different optical property of each optical lens in the plurality of camera filters is distinctive by being the only shade of that distinctive base color of each optical property in the plurality of camera filters.

6. The camera filter system of claim 1, wherein at least one of the camera filters has a brightness filtering property and includes a visual indicator with a one of the one or more distinctive base colors.

7. The camera filter system of claim 6, wherein the different brightness filtering property is a 3 stop, 6 stop, or 10 stop filter.

8. The camera filter of claim 1, wherein at least one of the camera filters has a polarizing filtering property and includes a visual indicator with one of the one or more distinctive base colors.

9. The camera filter system of claim 1, wherein the visual indicator is provided on the ring of the camera filter.

10. The camera filter system of claim 1, wherein the plurality of camera filters include a polarizing filter, a 3 stop filter, a 6 stop filter, and a 10 stop filter.

11. The camera filter system of claim 1, wherein the visual indicator associated with the polarizing optical property is blue, the visual indicator associated with the 3 stop filtering optical property is red, the visual indicator associated with the 6 stop filtering optical property is purple, and the visual indicator associated with the 10 stop filter is orange.

12. The camera filter system of claim 11, wherein the visual indicator associated with a camera filter having a 3 stop filtering optical property and a polarizing optical property is red and blue.

13. The camera filter system of claim 11, wherein the visual indicator associated with a camera filter having a 6 stop filtering optical property and a polarizing optical property is purple and blue.

14. The camera filter system of claim 11, wherein the visual indicator associated with a camera filter having a 10 stop filtering optical property and a polarizing optical property is orange and blue.

15. The camera filter system of claim 1, wherein one of the ring or the rim is magnetic.

16. The camera filter system of claim 1, wherein the plurality of camera filters include threaded fittings to attach the plurality of filters to a camera.

17. A camera filter comprising,
a ring;
a rim; and
an optical lens;
wherein the optical lens of the camera filter provides a unique optical property for the transmission of light through the optical lens, the unique optical property for the transmission of light through the optical lens including applying a unique alteration to light entering the optical lens among a plurality of camera filters; and
wherein the camera filter includes a visual indicator that includes a plurality of distinctive base colors on the camera filter, where each one of the plurality of distinctive base colors is uniquely associated with each optical property of the optical lens and that identifies the different optical properties of the optical lens among the plurality of camera filters.

18. The camera filter of claim 17, wherein the distinctive base color associated with each different optical property of each optical lens in the plurality of camera filters is distinctive by being the only shade of that distinctive base color of each optical property in the plurality of camera filters.

19. The camera filter of claim 17, wherein the visual indicator includes the plurality of distinctive base colors combined on the lens having a unique combination of optical properties.

20. The camera filter system of claim 17, wherein the unique optical property includes a brightness filtering property and a polarization property.

* * * * *